United States Patent [19]

Fried

[11] 3,888,952

[45] June 10, 1975

[54] PHOSPHONATES

[75] Inventor: John H. Fried, Palo Alto, Calif.

[73] Assignee: Syntex Corporation, Panama, Panama

[22] Filed: June 29, 1973

[21] Appl. No.: 374,903

Related U.S. Application Data

[62] Division of Ser. No. 125,854, March 18, 1971, Pat. No. 3,773,789, which is a division of Ser. No. 687,502, Dec. 4, 1967, Pat. No. 3,639,428.

[52] U.S. Cl. ............................................. 260/951
[51] Int. Cl. ............................................. C07f 9/40
[58] Field of Search ................................... 260/951

[56] References Cited

UNITED STATES PATENTS 3,555,123  1/1971  Fischer et al. ................. 260/951 X

*Primary Examiner*—Lorraine A. Weinberger
*Assistant Examiner*—Richard L. Raymond
*Attorney, Agent, or Firm*—Lawrence S. Squires; William B. Walker

[57] ABSTRACT

Preparation of $\alpha,\beta$-unsaturated carbocyclic ketones by reacting an enol lactone with a carbanion generated by treatment of a methylphosphonate or a monosubstituted methylphosphonate with base.

4 Claims, No Drawings

PHOSPHONATES

This is a division of application Ser. No. 125,854 filed Mar. 18, 1971, now U.S. Pat. No. 3,773,789, which in turn is a division of application. Ser. No. 687,502 filed Dec. 4, 1967, now U.S. Pat. No. 3,639,428.

The present invention relates to the production of unsaturated carbocyclic ketones.

More particularly, this invention relates to a novel process which has gneral utility for the conversion of enol lactones into α,β-unsaturated carbocyclic ketones.

The expression "enol lactone," as used herein, refers to an unsaturated lactone having α,β-ethylenic unsaturation in respect to the heterocyclic oxygen atom. The expression "α,β-unsaturated carbocyclic ketone," as used herein, refers to a carbocylic ketone having α,β-ethylenic unsaturation in respect to the keto group.

Prior to the present invention, enol lactones were converted into α,β-unsaturated carbocyclic ketones by a two-step process which involved reacting the enol lactone with about one equivalent of a Grignard reagent, for example, methylmagnesium chloride, to open the lactone ring and thereafter the thus-obtained diketonic intermediate product was cyclized by treatment with acid or alkali to obtain the carbocyclic ketone. See, for example, U.S. Pat. Nos. 3,057,907 and 3,321,489 and French Pat. No. 1,359,675. In addition to the disadvantage that the conversion of enol lactones into carbocyclic ketones requires at least two steps, prior method are often difficult to control, unsuitable for 5-membered ring systems, and of very narrow utlity in that the α,β-unsaturated carbocyclic ketones obtainable are very limited.

A primary object of the present invention, therefore, is to provide a process for the production of α,β-unsaturated carbocyclic ketones from enol lactones which overcomes the aforementioned disadvantages. Another object of the present invention is to provide a process for the production of α,β-unsaturated carbocyclic ketones which is economical and simple to operate but yet of great flexibility or adaptability in respect to the type of α,β-unsaturated carbocyclic ketone that can be produced. Another object of this invention is to provide a single-step process for the production of α,β-unsaturated carbocyclic ketones. Still another object of the present invention is to provide a process for the production of α,β-unsaturated carbocyclic ketones which is useful in the total synthesis of steroids and to novel intermediates therefor. Other objects, advantages and meritorious features of the present invention will become apparent as the invention is described in more detail hereinafter.

In accordance with the foregoing objects of the present invention, there has been discovered a very versatile process for the production of α,β-unsaturated carbocyclic ketones which comprises reacting, under substantially anhydrous conditions in an organic solvent inert to the reaction, an enol lactone with a carbanion generated by the reaction of base with a phosphonate selected from the group consisting of methylphosphonates and mono-substituted methylphosphonates.

The process of the present invention is applicable to the conversion of enol lactones into α,β-unsaturated carbocyclic ketones in general. The enol lactone can be either a monocyclic enol lactone or a polycyclic compound such as bicyclic, tricyclic and tetracyclic enol lactones depending upon the α,β-unsaturated carbocyclic ketone desired to be obtained. The process of the present invention is particularly suitable for enol lactone starting materials wherein the heterocyclic ring thereof contains at least 5 members and monoethylenic unsaturation. The enol lactones which can be converted into α,β-unsaturated carbocyclic ketones by the process of this invention are too numerous to list. Exemplary of the monocyclic and polycyclic enol lactones which can be used in the process of the present invention are α-angelica lactone, Δ⁴-valeryl lactone, isocoumarin, 3-methyl-6,8-dimethoxyisocoumarin, 3phenylisocoumarin, 3-benzoyl-7,8-dimethoxyisocoumarin, 3-chloroisocoumarin, benzal phthalide, 5,6,7-trimethoxyisocoumarin, δ-lactone of 1β-hydroxy-2β-methyl-2α-(2'-carboxyethyl)-3-hydroxycyclopent-3-ene, δ-lactone of 1β-hydroxy-4-(2'-carboxyethyl)5-hydroxy-7αβ-methyl-3aα, 4β,7,7a-tetrahydroindane, 4-oxa-17β-acetoxyandrost-5-en-3-one, 3-ethoxy-17-oxa-D-homoestra-1,3,5(10), 15-tetraen-17-one, 4-oxa-cholest-5-en-3-one, 17,20;20,2-1-bismethylenedioxy-4-oxa-11β-hydroxypregn-5-en-3-one, and 3-methoxy-16-oxaestra-1,3,5(10),8,14pentaen-17-one.

The phosphonates which are useful in the production of α,β-unsaturated carbocyclic ketones in accordance with the process of the present invention are the methylphosphonates and mono-substituted methylphosphonates. Methylphosphonates and mono-substituted methylphosphonates useful in the present invention are illustrated by the following formulas A and B, respectively:

wherein R is selected from the group consisting of substituted and unsubstituted, saturated and unsaturated, aliphatic, carbocyclic and carbocyclic-aliphatic radicals and R¹ is selected from the group consisting of substituted and unsubstituted, saturated and unsaturated, aliphatic, carbocyclic and carbocyclic-aliphatic radicals.

Phosphonates of formulas A and B above can be prepared, for example, by the reaction of a di-substituted phosphite (C) with an organic halide or sulfonate of the formula D and E, respectively, in the presence of a base, e.g. sodium hydride,

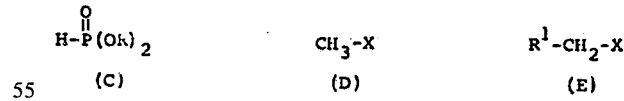

In the above formulas, R and R¹ are as defined above and X is chloro or bromo or OSO₂R, wherein R is alkyl or aryl. The formation of the phosphonates can be carried out in inert solvents such as ether, tetrahydrofuran, monoglyme, diglyme, or dioxane and preferably in an oxygen-free atmosphere. The method of preparing the phosphonates is not part of the present invention. A suitable procedure for the formation of methylphosphonates and mono-substituted methylphosphonates useful in the present invention is to react a di-substituted phosphite of formula C with an organic halide or sulfonate of formulas D and E in an inert solvent in the presence of about one equivalent of a base such as sodium hydride under an inert atmosphere at a temperature of about −10°C to about room temperature. Other methods are described in, for example, U.S. Pat. No. 2,754,319.

While the methylphosphonates and mono-substituted methylphosphonates which can be employed in the process of the present invention are too numerous to list here, they can be exemplified by the following:

dimethyl methylphosphonate
  dimethyl ethylphosphonate
  diethyl benzylphosphonate
  diethyl methylphosphonate
  dicyclohexyl methylphosphonate
  diphenyl methylphosphonate
  di-(n-butyl) methylphosphonate
  dibenzyl methylphosphonate
  diethyl methylphosphonate
  diethyl 4,4-dimethoxybutylphosphonate
  diethyl 4,4-ethylenedioxypentylphosphonate
  dimethyl 4,4-dimethoxy-3-methylbut-2-enylphosphonate
  diethyl 4-chloropent-3-enylphosphonate
  diethyl 4-(tetrahydropyran-2'-yloxy)-pentylphosphonate
  diethyl 4,4-ethylenedioxy-3-methylpentylphosphonate
  di(methoxyethyl) methylphosphonate
  di(2-ethylhexyl) methylphosphonate
  di(n-octyl) ethylphosphonate
  di(ethoxyethyl) methylphosphonate In the practice of the process of the present invention, a phosphonate of formula A or B is reacted with a base to generate the corresponding carbanion of the formula A' and B', respectively:

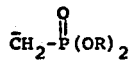  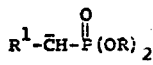

(A')  (B')

Because of the general instability of the phosphonate carbanion, it is necessary that the reaction between the phosphonate and base be carried out at low temperatures of the order of about −150°C to about −20°C, preferably about −100°C to about −40°C. After formation of the carbanion is complete, the low temperature of the reaction mixture is maintained during the addition of the enol lactone and thereafter the cooling means removed or otherwise raising the reaction temperature to about room temperature. Suitable bases for generating the carbanion include organo alkali metal compounds such as n-butyl lithium, phenyl lithium, methyl sodium, sodium acetylide, methyl potassium, methyl lithium, tolyl lithium, methyl potassium lithium pyridide, and the like; alkali metal hydrides such as sodium hydride, potassium hydride or lithium hydride; alkali metal amides such as sodamide, and the like.

In practicing the conversion of an enol lactone into the corresponding α,β-unsaturated carbocyclic ketone in accordance with the process of the present invention, the reaction is carried out using about equal molar amounts of the phosphonate, base and enol lactone. More than one molar equivalent of the phosphonate and base can be used but it is generally disadvantageous to do so because the excess reagent may react further with the carbonyl group of the desired carbocyclic ketone. Thus, it is preferred to use about one molar equivalent of the phosphonate and base or a modest excess of each such as up to about 1.2 molar equivalents. Any organic solvent can be used for the reaction medium so long as it is inert to the reaction and liquid at the reaction temperature being used. Suitable organic solvents include ether, tetrahydrofuran, dioxane, monoglyme, diglyme, and the like. The reaction between the carbanion and enol lactone generally goes to completion in from about 0.5 hours to about 48 hours depending upon such factors as temperature and the relative reactivity of the carbanion and the enol lactone. The reaction temperature can vary from about −150°C to about room temperature, preferably about −100°C to about room temperature depending upon such factors as the stability of the carbanion, the relative reactivity of carbanion and enol lactone being reacted and the time in which it is desired to complete the reaction. After formation of the carbanion is complete and the enol lactone has been introduced, the reaction mixture can be permitted to rise to about room temperature in order to complete the reaction in a shorter period of time. Depending upon the stability of the particular carbanion being used, the reaction mixture can be heated above room temperature, for example reflux temperature, if still shorter reaction times are desired. However, because of the general instability of the carbanion, the reaction between the phosphonate and base must be carried out at low temperatures of the order of about −150° to −20°C. For optimum results, it is important that the reaction be conducted under as near anhydrous conditions as possible and preferably under an inert oxygen-free atmosphere such as nitrogen, argon, and the like. While the concentration of the enol lactone and carbanion does not appear to be critical, it is preferred to operate at low concentrations of the order of about two to about 25 percent by weight of the reaction medium. The foregoing reaction conditions are largely dependent upon the particular phosphonate, base and enol lactone employed and are presented as a guide. Provided with the foregoing and the examples hereinafter, the most advantageous or optimum conditions and proportions of the enol lactone, phosphonate and base for a particular α,β-unsaturated carbocyclic ketone are easily determinable by one of ordinary skill in the art using routine experimentation.

In the case of enol lactone starting materials having other carbonyl groups present, e.g., an isolated keto group, it is preferable to introduce a protecting group prior to the reaction. In general, the phosphonate anions tend to react faster with the enol lactone.

The novel process of the present invention is particularly useful for the production of carbocyclic ketones suitable for the synthesis of steroids.

The term "lower alkyl," as used herein, refers to an alkyl group containing from 1 to 6 carbon atoms. The term "carboxylic acyl group," as used herein, refers to an acyl group containing up to about 12 carbons derived from substituted or unsubstituted carboxylic acids. Typical acyl groups include acetyl, trifluoroacetyl, trichloroacetyl, propionyl, butyryl, diethylacetyl, benzoyl, cyclopentylpropionyl, adamatoyl, trimethylacetyl, phenylacetyl, undecenoyl, and the like.

The following examples are provided to illustrate the present invention. Unless otherwise stated, temperature is centigrade and proportions are parts by weight.

EXAMPLE 1

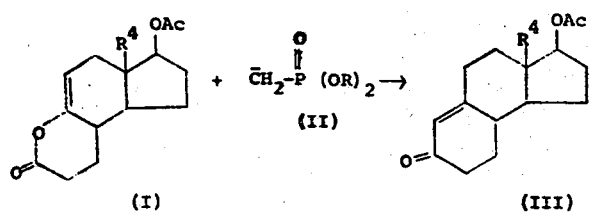

In the above formulas, R is as defined above, $R^4$ is methyl, ethyl or propyl and Ac is hydrogen or a carboxylic acyl group.

To a solution of 1 g. of dimethyl methylphosphonate in 30 ml. of dry tetrahydrofuran under nitrogen and cooled to −78°, there is added some equivalent of n-butyl lithium in hexane with stirring. After about 10 minutes at −78°, one equivalent of the tricyclic enol lactone (I) ($R^4$ is methyl; Ac is benzoyl) in 35 ml. of dry tetrahydrofuran is added. The reaction mixture is allowed to rise to room temperature and stand for about 2 hours. The reaction mixture is diluted with water and extracted with ether. The ether extracts are combined, washed with water, dried and evaporated under reduced pressure to give the tricarbocyclic ketone (III) ($R^4$ is methyl; Ac is benzoyl) which can be further purified by chromatography, if desired.

The tricarbocyclic ketone (III) can be used to prepare therapeutically useful 19-nor or $\Delta^{1,3,5(10)}$-steroids using the procedure of, for example, U.S. Pat. No. 3,150,152.

The tricyclic enol lactone of formula I can be obtained according to the procedure of French Pat. No. 1,359,675 (1964) or Velluz, et a., Tetrahedron, Suppl. 8, Part II, pp. 495–505 (1966) and references cited therein.

The process of Example 1 is repeated with the exception of using dimethyl ethylphosphonate in place of dimethyl methylphosphonate and there is obtained the α,β-unsaturated tricarbocyclic ketone of formula IV ($R^4$ is methyl; Ac is benzoyl).

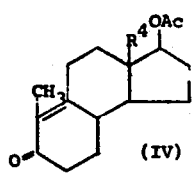

EXAMPLE 2

To a solution of 4 g. of diethyl 4,4-ethylenedioxypentylphosphonate (V) (R is ethyl) in 50 ml. of dry monoglyme under nitrogen and cooled to about −80°, there is added one equivalent of n-butyl lithium in hexane with stirring. After about 5 minutes at −80°, one equivalent of the tricyclic enol lactone (I) ($R^4$ is methyl; Ac is benzoyl) in 75 ml. of dry monoglyme is added and the reaction mixture allowed to rise to room temperature. The reaction mixture is allowed to stand for about 2.5 hours and then diluted with water. The mixture is extracted with ether and the ether extracts combined, washed, dried and evaporated under reduced pressure to give the tricarbocyclic ketone (VI) ($R^4$ is methyl; Ac is benzoyl) which can be further purified by chromatography on alumina.

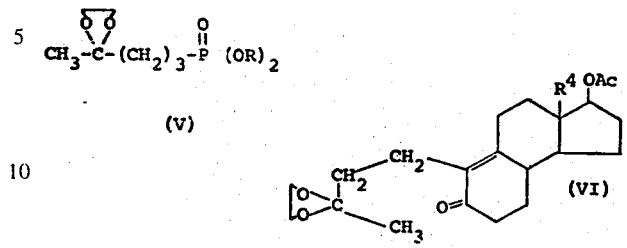

The α,β-unsaturated tricarbocyclic ketone of formula VI is an excellent intermediate for the preparation of 19-nor steroids using the procedure of, for example, French Pat. Nos. 1,369,964 (1964), 1,432,570 (1964); 1,452,898 (1965) or Velluz et al., ibid.

The mono-substituted methylphosphonate (V) can be prepared using the following procedure.

To a solution of 5.5 g. of pure sodium hydride in 200 ml. of dry tetrahydrofuran under nitrogen, there is added one equivalent of dry diethyl phosphite. The mixture is cooled in an ice-bath and stirred at 0° to 1.5 hours. One equivalent of the ethylene ketal of 1-bromopentan-4-one in 60 ml. of dry tetrahydrofuran is added and the mixture stirred for 15 minutes at 0° and allowed to stand 16 hours at room temperature. The mixture is then heated under reflux for 3 hours, cooled and filtered. The filtrate is concentrated under reduced pressure and the concentrate taken up in ether. This mixture is shaken with saturated aqueous sodium chloride and then separated. The organic layer is separated and concentrated under reduced pressure to give diethyl 4,4-ethylenedioxypentylphosphonate (V) (R is ethyl) which is purified by distillation in vacuo (b.p. 115° at 0.05 mm.).

By using other phosphites, e.g., dimethyl phosphite, dibenzyl phosphite or diphenyl phosphite, in place of diethyl phosphite in the above procedure, the corresponding di-substituted phosphonates are obtained.

EXAMPLE 3

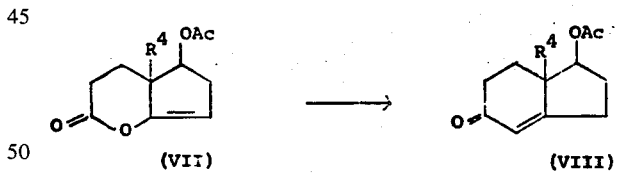

To a suspension of 2 g. of dimethyl methylphosphonate in 50 ml. of dry tetrahydrofuran at −78° under nitrogen, there is added one equivalent of n-butyl lithium in hexane with stirring. After about 5 minutes, there is added one equivalnet of bicyclic enol lactone (VII) ($R^4$ is methyl; Ac is benzoyl) in 50 ml. of dry tetrahydrofuran while maintaining the temperature at about −78°. The reaction mixture is allowed to warm to room temperature and to stand at room temperature for 3 hours. The reaction mixture is diluted with water and then extracted with ether. The ether extracts are combined, washed, dried and evaporated under reduced pressure to give the bicarbocyclic ketone (VIII) ($R^4$ is methyl; Ac is benzoyl) which can be further purified by chromatography or fractional distillation.

The α,β-unsaturated bicarbocyclic ketone of formula VIII is a valuable intermediate for the synthesis of steroids using the method of, for example, Whitehurst, et al., U.S. Pat. No. 3,317,566.

The bicyclic enol lactone of formula VII can be prepared using the following procedure.

A mixture of 0.3 ml. of 2-methylcyclopentane-1,3-dione, 0.33 ml. of methylacrylate and 0.1 g. of potassium t-butoxide in 200 ml. of t-butanol is allowed to stand at about 20°C for 72 hours. The reaction mixture is washed with water, dilute sodium hydroxide and then water to neutral, dried and evaporated to give 2-methyl-2-(β-carbomethoxyethyl)cyclopentane-1,3-dione which was purified by distillation.

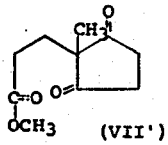

(VII')

The above prepared diketoester is then hydrolyzed to the acid by treatment with 1 percent potassium carbonate in warm methanol:water (1:1) for 8 hours. A total of 5 g. of this acid is mixed with 50 ml. of acetic anhydride containing 2 g. of anhydrous sodium acetate and the mixture boiled for 5 hours. The acetic anhydride is then removed by distillation in vacuo to furnish a residue which is poured into water and extracted with ethyl acetate. The ethyl acetate extracts are combined, washed nuetral with water, dried, and evaporated. Purification of the resulting residue by vacuum distillation affords 1.2 g. of the enol lactone (VII"):

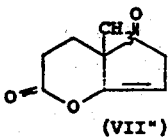

(VII")

A mixture of 5 g. of the diketoester (VII'), 100 ml. of tetrahydrofuran and 1.3 molar equivalents of lithium tri-t-butoxyaluminum hydride is heated at reflux until the hydride reagent is consumed. The reaction mixture is cooled, diluted with concentrated aqueous sodium sulfite solution and the resulting clear supernatant decanted and evaporated. The resulting residue is purified by chromatography on alumina to furnish 1.3 g. of the following alcohol:

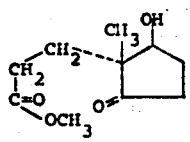

which is converted into the corresponding benzoate by treatment with benzoyl chloride in pyridine. The methyl ester is hydrolyzed to the acid which is then cyclized by the procedure described above to furnish the enol lactone of formula VII ($R^4$ is methyl; Ac is benzoyl).

By using 2-ethylcyclopentane-1,3-dione and 2-propylcyclopentane-1,3-dione in place of 2-methylcyclopentane-1,3-dione in the above procedure, the corresponding enol lactones wherein $R^4$ is ethyl and propyl, respectively, are obtained.

EXAMPLE 4

The process of Example 3 is repeated with the exception of using an equivalent amount of the phosphonate of formula IX (R is ethyl; $R^2$ is hydrogen; $R^3$ and $R^4$ are methyl and Ac is benzoyl) in place of dimethyl methylphosphonate and the substituted bicarbocyclic ketone (X) ($R^2$ is hydrogen; $R^3$ and $R^4$ are methyl and Ac is benzoyl) is obtained.

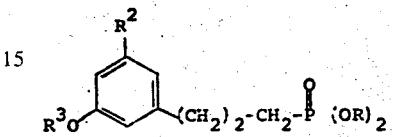

(IX)

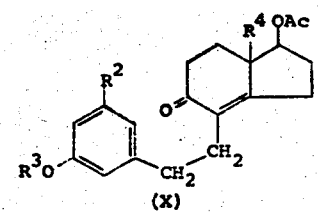

(X)

In the above formulas, Ac, R and $R^4$ are as defined hereinabove, $R^2$ is hydrogen or a lower alkoxy of 1 to 6 carbon atoms and $R^3$ is a lower alkyl of 1 to 6 carbon atoms.

By using other phosphonates of formula IX in the above process, the correspondingly substituted α,β-unsaturated bicarbocyclic ketone of formula X is obtained.

The phosphonates of formula IX can be obtained by using an equivalent amount of the bromide (XI) in place of the ethylene ketal of 1-bromopentan-4-one in the procedure set out in Example 2. The bromide (XI) can be prepared from the corresponding acid by the following procedure.

Ten grams of m-methoxycinnamic acid in 100 ml. of ethanol is hydrogenated with 0.5 g. of pre-reduced 10 percent palladium-on-charcoal until the uptake of hydrogen ceases. The catalyst is removed by filtration and the filtrate evaporated to yield 3-(m-methoxyphenyl)-propionic acid.

A solution of 5 g. of the foregoing propionic acid in 100 ml. of tetrahydrofuran is added cautiously to a boiling solution of 250 ml. of tetrahydrofuran containing 3 g. of lithium aluminum hydride. The reaction mixture is refluxed overnight with stirring and then cooled and the excess of hydride decomposed by the cautious addition of ethyl acetate and then saturated sodium sulfate. The resulting clear solution is decanted and dried over sodium sulfate. The solvent remaining is removed by distillation to give 3-(m-methoxyphenyl)propanol which is purified by distillation in vacuo. One gram of this propyl alcohol in 50 ml. of benzene is boiled with a slight excess of phosphorus pentabromide until thin layer chromatography no longer indicates the presence of starting alcohol. The reaction mixture is cooled, washed with water and dilute sodium carbonate solution, dried over sodium sulfate and concentrated to dryness to give 3-(m-methoxyphenyl)propionyl bromide (XI) ($R^2$ is hydrogen; $R^3$ is methyl) which is purified by distillation.

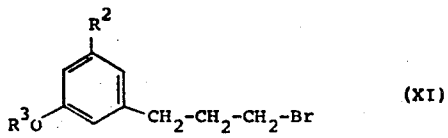

By using 3,5-dimethoxycinnamic acid in place of m-methoxycinnamic acid, the bromide (XI) in which $R^2$ is methoxy and $R^3$ is methyl is obtained.

The bicarbocyclic ketones of formula X above can be converted into estra-1,3,5(10),8,14-pentaenes by treatment with p-toluenesulfonic acid in benzene or by the method of U.S. Pat. No. 3,317,566. The thus-obtained estra-1,3,5(10),8,14-pentaene can be converted into therapeutically useful steroids by known procedures, see for example, U.S. Pat. No. 3,337,542.

EXAMPLE 5

To a suspension of 4 g. of dibutyl methylphosphonate in 75 ml. of dry monoglyme at about −78° under nitrogen, there is added with stirring one equivalent of n-butyl lithium in hexane. After about 10 minutes, there is added one equivalent of 17β-acetoxy-4-oxa-androst-5-en-3-one in 75 ml. of dry tetrahydrofuran while maintaining the temperature at about −78°. The reaction mixture is allowed to warm to room temperature and then left to stand for about 4 hours. The reaction mixture is diluted with water and extracted with ether. The ether extracts are combined, washed, dried and evaporated to give the testosterone acetate (17β-acetoxyandrost-4-en-3-one) which can be purified by chromatography.

By using diethyl ethylphosphonate in the process of this example, the correspondingly substituted tetracarbocyclic compound is obtained, i.e., 4-methyl testosterone acetate.

By using other steroidal enol lactones in the above process in place of 17β-acetoxy-4-oxa-androst-5-en-3-one as the starting material, e.g. 4-oxa-cholest-5-en-3-one, 3-ethoxy-17-oxa-D-homoestra-1,3,5(10),15-tetraen-17-one, 17,20;20,21bismethylenedioxy-11β-hydroxypregn-5-en-3-one, and the like, the corresponding α, β-unsaturated tetracarbocyclic ketone is obtained, e.g., cholest-4-en-3-one, 3-ethoxy-D-homoestra-1,3,5(10),14-pentaen-17-one, and 17,20;20,21-bismethylenedioxy-11β-hydroxypregn-4-en-3-one.

EXAMPLE 6

To a suspension of 2 g. of dibenzoyl methylphosphonate in 30 ml. of dry tetrahydrofuran cooled to a temperature of about −60° under nitrogen, there is added 1.1 equivalents of phenyl lithium in hexane with stirring. After about 5 minutes, there is added, while maintaining the temperature at about −60°, 0.95 equivalents of angelica lactone (XIII) in 40 ml. of dry tetrahydrofuran. The reaction mixture is allowed to warm to room temperature and then left to stand for about two hours. The mixture is then diluted with water and the product extracted with ether to give 3-methylcyclopent-2-en-1-one (XIV) which can be purified by vacuum distillation.

By using a mono-substituted methylphosphonate, for example, dietheyl ethylphosphonate in the above process, the corresponding 2-substituted α,β-unsaturated cyclopentone is obtained, e.g., 2,3-dimethylcyclpent-2-en-1-one.

EXAMPLE 7

To a solution of 5 g. of dimethyl methylphosphonate in 100 ml. of dry tetrahydrofuran cooled to about −78° under nitrogen, there is added with stirring one equivalent of n-butyl lithium in hexane. After about 10 minutes, there is added one molar equivalent of 3-methoxy-16-oxaestra-1,3,5(10),8,14-pentaen-17-one in dry tetrahydrofuran while maintaining the temperature at about −78°. The mixture is allowed to warm to room temperature and then left to stand at room temperature for 5 hours. The mixture is diluted with water and then extracted with ether. The ether extracts are combined and concentrated to furnish a residue which is chromatographed on neutral alumina eluting with benzene to afford 3-methoxy-14β-estra-1,3,5(10),8,15-pentaen-17-one and 3-methoxy-14α-estra-1,3,5(10),8,15-pentaen-17-one which can be further purified by recrystallization from aqueous methanol.

0.5 g. of 3-methoxy-14α-estra-1,3,5(10),8,15-pentaen-17-one in 25 ml. of ethanol is reduced catalytically with 50 mg. of 5 percent palladium-on-charcoal until a molar equivalent of hydrogen is taken up. The catalyst is filtered off and the filtrate evaporated to dryness to yield the known 3-methoxyestra-1,3,5(10),8-tetraen-17-one which can be converted into estrone methyl ether by procedures outlined in Chemistry & Industry (London), 1,022 (1960) or into 19-nor-Δ⁴-steroids using the procedure of, for example, U.S. Pat. No. 3,318,922.

By repeating the above process using other 16-oxa steroids of the formula XV, e.g. 3-methoxy-15-methyl-16-oxaestra-1,3,5(10),6,8,14-hexaen-17-one as the tetracyclic enol lactone starting material, the corresponding steroidal ketone (tetracarbocyclic ketone) of the formula XVI is obtained, e.g. 3-methoxy-15-methyl-14α-estra-1,3,5(10),6,8,15-hexaen-17-one and 3-methoxy-15-methyl-14β-estra-1,3,5(10),6,8,15-hexaen-17-one.

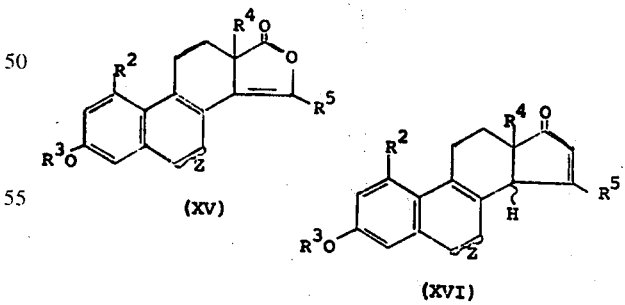

In the above formulas, $R^2$, $R^3$ and $R^4$ are as defined hereinabove, $R^5$ is hydrogen or methyl and Z is a carbon to carbon single or double bond between C-6 and C-7.

The tetracarbocyclic ketones (XVI) can be converted into therapeutically useful steroids using the procedures described and referenced above. The 15-methyl substituted steroids can be used in the same manner as the corresponding 15-unsubstituted steroids.

The tetracyclic enol lactones of formula XV can be prepared according to the method of copending U.S. application Ser. No. 638,648, filed May 15, 1967 and U.S. Pat. No. 3,309,383.

EXAMPLE 8

The process of Example 2 is repeated with the exception that the phosphonate employed is a phosphonate of formula XVII and there is obtained the substituted tricarbocyclic ketone (XVIII) which is useful in the synthesis of valuable 2-methyl-19-nor steroids and 2-methylandrostene steroids using the procedure of, for example, Velluz, et al., ibid.

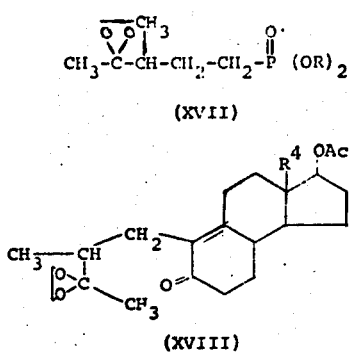

The mono-substituted methylphosphonates of formula XVII can be prepared by the procedure described in Example 2 using the ethylene ketal of 1-bromo-3-methylpentan-4-one as the starting material. This bromide starting material can be prepared according to the following procedure.

A mixture of 0.5 moles of 1-acetoxypentan-4-one and 0.5 moles of piperidine in benzene is refluxed using a water separator until no more water distills from the reaction mixture. The reaction mixture is then cooled, washed and dried to afford the 4-piperidyl-1-acetoxypent-3-ene (XIX). A mixture of 5 g. of XIX in 100 ml. of dioxane is treated with an excess of methyl iodide at 20°C for 18 hours and then heated at 70°C for six hours. The reaction mixture is concentrated to a small volume, diluted with water and 1-acetoxy-3-methylpentan-4-one isolated by extraction with ethyl acetate. A mixture of 0.5 g. of this ketone, 100 mg. of p-toluenesulfonic acid, 3 ml. of ethyleneglycol and 100 ml. of benzene is refluxed using a water separator for 24 hours. The reaction mixture is cooled and then 100 ml. of ethanol and 2 g. of potassium hydroxide are added. This mixture is refluxed for six hours, cooled, diluted with water and the corresponding ethylene ketal is isolated by extraction with ethyl acetate. A solution of 0.1 moles of the ketal in 50 ml. of dimethylformamide containing 0.1 moles of triphenylphosphine is reacted with 0.1 moles of carbon tetrabromide at room temperature for 18 hours. The mixture is diluted with water and extracted with ether. The ether extracts are combined, washed with water, dried and evaporated. The residue is chromatographed on 400 g. of alumina eluting with hexane-benzene and benzene to give the ethylene ketal of 1-bromo-3-methylpentan-4-one.

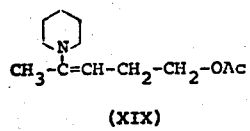

EXAMPLE 9

A mixture of 10 g. of 1-chloropentan-4-one, 100 ml. of ether and 1 g. of lithium aluminum hydride is allowed to stand at 20°C for 20 hours. The reaction mixture is diluted with water and separated. The organic phase is washed with water, dried and evaporated to give 1-chloropentan-4-ol which is purified by distillation. Two ml. of dihydropyran is added to a solution of 1 g. of 1-chloropentan-4-ol in 15 ml. of benzene. About 1 ml. is removed by distillation to remove moisture and 0.4 g. of p-toluenesulfonic acid is added to the cooled solution. This mixture is allowed to stand at room temperature for four days and is then washed with aqueous sodium carbonate solution and water, dried and evaporated to yield 4-(tetrahydropyran-2'-yloxy)-1-chloropentane which is subjected to the procedure described in Example 2 to give the phosphonate (XX).

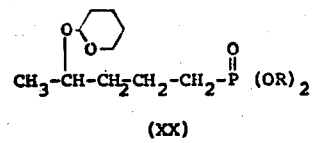

The process of Example 2 is repeated with the exception that the phosphonate of formula XX (R is ethyl) is used in place of the phosphonate (V) (R is ethyl) and there is obtained the tricarbocyclic ketone (XXI) which can be converted into 19-nor steroids described hereinabove, see for example, Example 2.

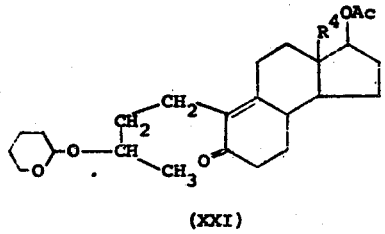

EXAMPLE 10

To a suspension of 4 g. of diethyl (4-chloropentyl-3-enyl)phosphonate in 50 ml. of dry monoglyme at about −78°, there is added 1.1 equivalents of butyl lithium in hexane with stirring under nitrogen. After about 10 minutes, there is added 1.1 equivalents of the tricyclic enol lactone (I) ($R^4$ is methyl; Ac is benzoyl) in 60 ml. of dry monoglyme while maintaining the temperature at about −78°. The reaction mixture is allowed to warm to room temperature and then left to stand at room temperature for about two hours. The reaction mixture is diluted with water and then extracted with ether. The ether extracts are combined, washed, dried over magnesium sulfate and evaporated under reduced pressure to afford the α,β-unsaturated tricarbocyclic ketone (XXII) ($R^4$ is methyl; Ac is benzoyl) which can be purified further by chromatography on alumina.

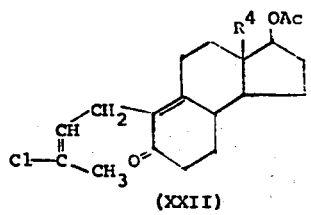

(XXII) (XXIII) (XXIV)

The tricarbocyclic ketone (XXII) is a useful intermediate for the synthesis of valuable 19-nor steroids using known procedures such as described in U.S. Pat. Nos. 3,050,550, 3,019,252 and 3,150,152.

The phosphonate used in the process of this example can be prepared according to the following procedure.

A mixture of 10 g. of 1-bromopentan-4-one, 100 ml. of carbon tetrachloride and 5 g. of phosphorus pentachloride is refluxed for 10 hours. The reaction mixture is then cooled, washed with dilute sodium carbonate and water, dried over magnesium sulfate and evaporated to give 1-bromo-4-chloropent-3-ene which is purified by distillation and converted into the phosphonate by the procedure described in Example 2.

EXAMPLE 11

To a suspension of 4 g. of diethyl 4,4-dimethoxybutylphosphonate in 50 ml. of dry monoglyme at about −70°under nitrogen, there is added one equivalent of phenyl lithium in hexane with stirring. After about 5 minutes, there is added 1.0 equivalent of the bicyclic enol lactone (VII) ($R^4$ is ethyl; Ac is benzoyl) in 50 ml. of dry monoglyme while maintaining the temperature at about −70°. The reaction mixture is allowed to warm to room temperature and then allowed to stand at room temperature for 3.5 hours. The reaction mixture is then diluted with water and extracted with ether. The ether extracts are combined, washed, dried over magnesium sulfate and evaporated under reduced pressure. The residue is chromatographed on silica gel to afford the α,β-unsaturated bicarbocyclic ketone (XXIII) ($R^4$ is ethyl; Ac is benzoyl).

A mixture of 1 g. of the above bicarbocyclic ketone, 25 ml. of dioxane and 1 ml. of 5 percent aqueous HCL is boiled 15 minutes. The reaction mixture is allowed to cool, poured into water and the resulting mixture separated. The organic phase is evaporated to dryness to furnish the corresponding aldehyde which is taken up in 20 ml. of acetone, cooled to 0°C and a slight molar excess of Jones reagent (prepared by mixing 26 g. of chromium trioxide with 23 ml. of concentrated sulfuric acid and diluting with water to 100 ml.). Upon completion of the oxidation as followed by thin layer chromatography, the reaction mixture is diluted with water and then extracted with ethyl acetate. The ethyl acetate extracts are combined, washed with water, dried and evaporated under reduced pressure to afford the acid (XXIV) ($R^4$ is ethyl; Ac is benzoyl) which is a valuable intermediate for the synthesis of known 19-nor-$\Delta^4$ and $\Delta^{5(10)}$-steroids useful as therapeutic agents using the procedure of, for example, Belgium Pat. No. 629,251 (1963); French Pat. No. 1,465,400 (1965) or Velluz, et al., ibid.

The diethyl 4,4-dimethoxybutylphosphonate employed in this example can be obtained according to the following procedure.

To 0.5 moles of diethylmalonate in 0.5 liters of dry benzene is added 0.5 moles of sodium hydride cautiously and the mixture stirred until hydrogen evolution ceases. Then 0.5 moles of bromoacetaldehydedimethylacetal [ $(CH_3O)_2$—CH—$CH_2$—Br] in 100 ml. of benzene is added and the mixture stirred overnight followed by refluxing for 2 hours. The reaction mixture is cooled, washed with water and purified by vacuum distillation to give β,β-dimethoxyethylmalonic acid diethyl ester. A mixture of 5 g. of this ester in 100 ml. of ethanol containing 5 g. of sodium hydroxide is heated under reflux until evolution of carbon dioxide ceases. The reaction mixture is then saturated with carbon dioxide and evaporated to dryness under vacuum. The residue is suspended in 50 ml. of dry dimethylformamide to which is added a large excess of methyl iodide. The reaction mixture is stirred at room temperature for about 24 hours and then poured into water. The resulting mixture is extracted with ether and the ether extracts combined, washed with water and evaporated to give 4,4-dimethoxybutyric acid methyl ester which is purified by distillation. A mixture of 4 g. of this methyl ester, 50 ml. of dry tetrahydrofuran and 1.1 equivalents of lithium aluminum hydride is refluxed overnight. The reaction mixture is allowed to cool and then filtered with water. This mixture is extracted with ether and the ether extracts are combined, washed, dried and evaporated to dryness to afford 4,4-dimethoxybutanol [ $(CH_3O)_2$—CH—$CH_2$—$CH_2$—$CH_2$—OH].

A solution of 0.1 moles of 4,4-dimethoxybutanol in 50 ml. of dimethylformamide containing 0.1 moles of triphenylphosphine is allowed to react for 18 hours with 0.1 moles of carbon tetrabromide. The mixture is diluted with water and extracted with ether. The ether extracts are combined, washed with water, dried and evaporated to a crude product which is purified by distillation to yield 4,4-dimethoxybutylbromide. This bromide is then converted into the diethyl phosphonate using the procedure described in Example 2.

EXAMPLE 12

The process of Example 11 is repeated using a phosphonate (XXV) as the phosphonate reagent and n-butyl lithium as the base and the corresponding carbocyclic ketone (XXVI) is obtained which can be converted into valuable 6-methyl steroids.

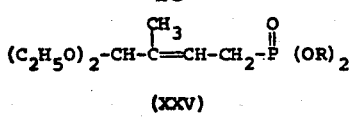

(XXV)

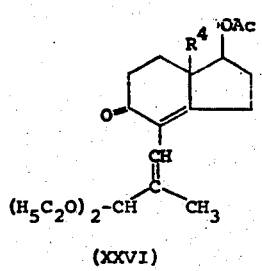

(XXVI)

Conversion of the carbocyclic ketone (XXVI) into 6-methyl steroids can be accomplished by, for example, catalytic reduction using 5 percent palladium-on-charcoal in ethanol to the intermediate (XXVII) which is converted into the free acid (XXVIII) using the procedure described in Example 11. The free acid can then be cyclized to the tricyclic enol lactone (XXIX) using the method of Velluz, et al., ibid. The enol lactone (XXIX) can then be treated as described in Example 1 and 2 to obtain the corresponding tricarbocyclic ketone which can be converted into 6-methyl steroids using the procedures referenced therein.

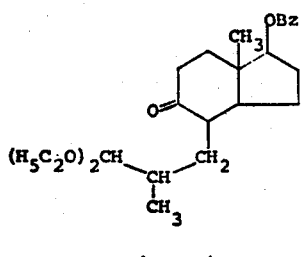

(XXVII)

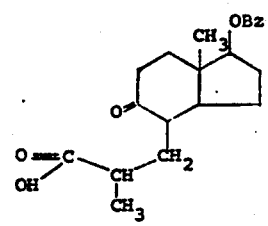

(XXVIII)

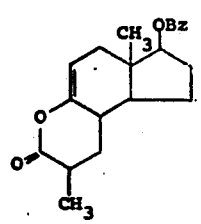

(XXIX)

EXAMPLE 13

Diethyl methylphosphonate (1.94 g.) suspended in 50 ml. of dry tetrahydrofuran is treated with 1.1 equivalents of butyl lithium in hexane under nitrogen at about −78°. After 10 minutes, one equivalent of benzalphthalide in 10 ml. of tetrahydrofuran is added while maintaining the temperature at about −78°. The reaction mixture is allowed to warm to room temperature and then left to stand at room temperature for 3 hours. The reaction mixture is diluted with water and then extracted with ether. The ether extracts are combined, washed with water, dried and the solvent removed under vacuum. The residue is chromatographed on silica eluting with methylene chloride:hexane (4:1) to afford 3-benzylind-2-en-1-one and a small amount of starting material.

EXAMPLE 14

The process of Example 3 is repeated with the exception that the phosphonate (XXX) (R is ethyl) is used in place of dimethyl methylphosphonate and there is obtained the substituted bicarbocyclic keonte (XXXI) (R⁴ is methyl; Ac is benzoyl).

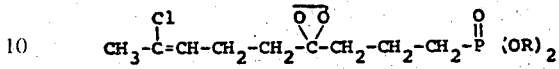

(XXX)

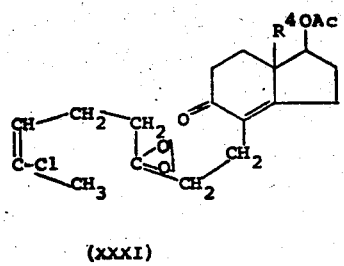

(XXXI)

The novel bicarbocyclic ketone (XXXI) is useful for the preparation of the known tricarbocyclic ketones (XXII) which can be used to prepare 19-nor steroids. Thus, hydrogenation of the bicarbocyclic ketone using, for example, 5 percent palladium-on-charcoal in ethanol followed by deketalization under mild condition such as 1 percent sulfuric acid in dioxane with refluxing for one hour furnishes the intermediate (XXXII) which can be cyclized using, e.g., a base as described by, e.g., Velluz, et al., ibid, U.S. Pat. Nos. 3,102,145 and 3,150,152, or French Pat. 1,480,247, to furnish the tricarbocyclic ketone XXII (Ac is hydrogen).

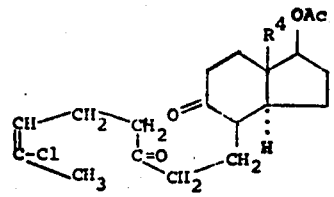

(XXXII)

The phosphonate (XXX) can be prepared using the following procedure.

A mixture of 0.5 moles of 1,3-dithiane and 300 ml. of teterahydrofuran cooled to −30° is treated with 0.5 molar equivalents of 1.5 molar n-butyl lithium in hexane under nitrogen and stirred for 15 hours at −20°. Then 0.5 moles of the tetrahydropyranyl ether of 3-bromopropanol in 200 ml. of tetrahydrofuran is added slowly with stirring at −5° and then left for 14 hours at 0° under nitrogen. The resulting mixture is cooled to −30° and treated with an additional 0.5 molar equivalents of 1.5 molar n-butyl lithium in hexane. After 1.5 hours, 0.5 moles of 4-chloro-1-bromopent-3-ene in 200 ml. of tetrahydrofuran is added. The reaction mixture is left standing for 18 hours at 0° and then allowed to warm to room temperature for four hours. Water is added and the resulting mixture extracted with ether. The ether extracts are combined, washed with water, dried and concentrated. The resulting dialkylated thiane (XXXIII) is dissolved in methanol and stirred for two hours with 20 ml. of 1 percent oxalic acid solution. The reaction mixture is poured into water containing an excess of sodium carbonate solution and then extracted with ether to afford the corresponding free hydroxy compound. The free hydroxy compound is dissolved in dry ethylene glycol containing 0.5 g. of mercuric chloride. This reaction mixture is allowed to stand overnight and then heated to 60° for 5 hours. After cooling, water is added and the ketal (XXXIV) isolated by extraction with ether. A mixture of 2 g. of the ketal and 30 ml. of methylene chloride: pyridine (2:1) is cooled to −70° and then treated with one equivalent of tosylchloride in methylene chloride. The mixture is left standing at 0° for 18 hours and then allowed to warm to room temperature. The mixture is then diluted with water and the resulting tosylate isolated by extraction with methylene chloride and purified by chromatography on deactivated alumina. This tosylate (0.5 g.) in 25 ml. of acetone is refluxed for 24 hourswith 0.5 g. of sodium iodide. After cooling, the reaction mixture is diluted with water and extracted with ether. The resulting crude iodide is treated with sodium hydride and diethyl phosphite as described in Example 2 to furnish the phosphonate (XXX) (R is ethyl).

Alternatively, the tosylate can be reacted with sodium hydride and diethyl phosphite using the procedure of Example 2 to obtain the phosphonate.

By repeating the preparation using other phosphites, e.g., dibutyl phosphite, dicyclohexyl phosphite, dimethyl phosphite or diphenyl phosphite in place of diethyl phosphite, the corresponding phosphonates are obtained.

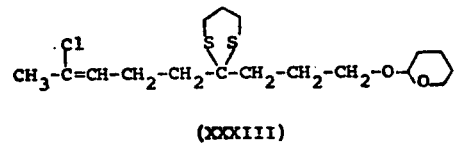

(XXXIII)

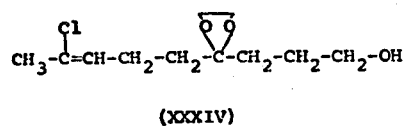

(XXXIV)

EXAMPLE 15

The process of Example 2 is repeated using as the phosphonate reagent, the phosphonate of formula XXXV (R is ethyl) and there is obtained the tricarbocyclic ketone (XXXVI) (Ac is benzoyl) which can be converted into 19-nor steroids or androstane steroids by methods disclosed in the Journal of Amereican Chemical Society, 82, No. 21, 5464 (1967).

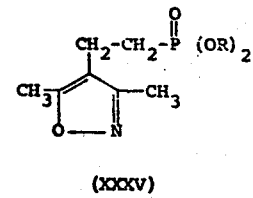

(XXXV)

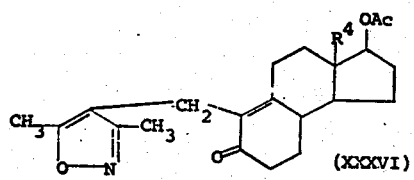

The phosphonate (XXXV) can be obtained according to the following outlined procedure.

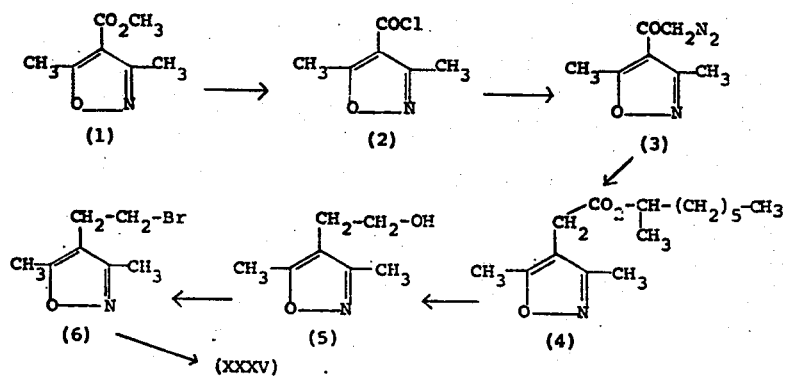

Ten grams of the isoxazole (1) is heated at reflux with 200 ml. of 1 percent sodium hydroxide in methanol for five hours. The reaction mixture is then acidified to pH 3 with HCl and the acidified mixture is then concentrated to a small volume under reduced pressure. Water is added and the acid isolated by extraction with ethyl acetate. The crude acid (9 g.) is taken up in methanol and treated with one equivalent of sodium methoxide. The alcohol is evaporated and the residue dried under reduced pressure. The residue is then suspended in dry benzene and treated at 0°C with an excess of oxalyl chloride. After the evolution of gas ceases, the reaction mixture is allowed to warm to room temperature and the excess of oxalyl chloride removed by evaporation of the solvent medium to dryness. The resulting acid chloride (2) is taken up in benzene and treated with an excess of ethereal diazomethane. After the formation of the diazoketone is complete, the ether is removed and the resulting diazoketone heated under reflux in octane-2-ol until nitrogen evolution ceases. The crude product is purified by distillation and reduced with an excess of lithium aluminum hydride in 200 ml. of tetrahydrofuran under reflux. The reaction mixture is decomposed by cautious addition of ethyl acetate and the inorganic salts precipitated by the addition of concentrated sodium sulfate solution. The solution is then filtered and evaporated to yield the alcohol (5) which is purified by distillation. The alcohol (5) is then treated with phosphorus tribromide in benzene to give the bromide (6) which is con-

EXAMPLE 16

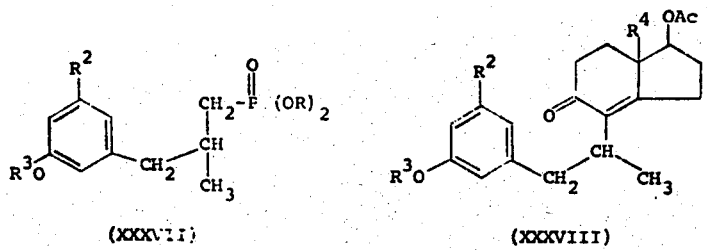

The process of Example 3 is repeated with the exception that dimethyl methylphosphonate is replaced with an equivalent amount of the phosphonate (XXXVII) (R is ethyl; $R^2$ is hydrogen; $R^3$ is methyl) and the corresponding substituted α, β-unsaturated bicarbocyclic ketone (XXXVIII) is obtained.

The bicarbocyclic ketones of formula XXXVIII are excellent intermediates for the production of valuable 7-methyl steroids using the procedures described in Example 4.

The phosphonates of formula XXXVII can be prepared according to the following outlined procedure wherein $R^2$, $R^3$ and X are as defined hereinabove.

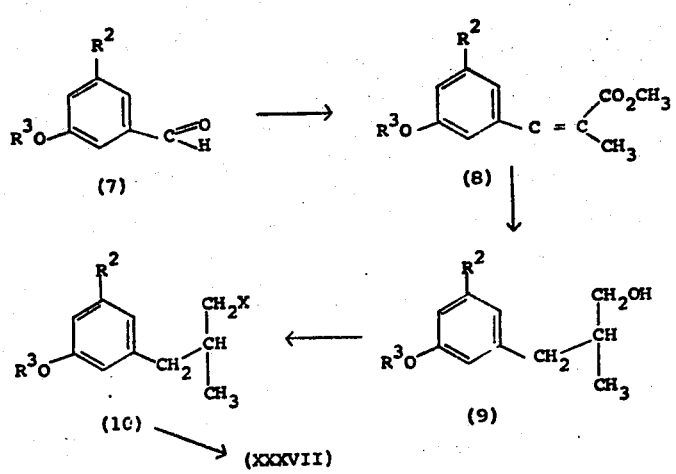

A solution of 0.6 moles of the aldehyde (7) and 0.5 moles of methyl α-bromopropionate in 80 ml. of dry benzene is added dropwise to 0.6 moles of zinc dust. After 15 ml. of the solution is added, the mixture is heated to initiate the reaction. The remaining portion of the solution is then added during one hour. The resulting mixture is cooled, washed with water, dried and then refluxed with 0.2 g. of p-toluenesulfonic acid for 5 hours. After cooling, the reaction mixture is washed with dilute sodium bicarbonate solution and water and then dried and purified by distillation to give 8. One gram of 8 in 25 ml. of ethanol is hydrogenated with 0.1 g. of 5 percent palladium/carbon catalyst until 1 molar equivalent of gas is taken up. The catalyst is filtered off and solvent evaporated to give 2-methyl-3-(substituted phenyl)propionic acid methyl ester. One gram of this ester in 100 ml. of tetrahydrofuran is reduced with 2 g. of lithium aluminum hydride until thin layer chromatography indicates the absence of starting ester. The reaction mixture is cooled, treated cautiously with an excess of ethyl acetate followed by saturated sodium sulfate solution. The organic layer is decanted off, dried with sodium sulfate and evaporated to give the alcohol (9) which is converted into the corresponding halide or tosylate (10) by procedures described herein (see Examples 4, 8 and 14). The halide or tosylate (10) is then converted into the phosphonate (XXXVII) using the procedure described in Example 2.

EXAMPLE 17

By subjecting the tricarbocyclic ketone (XXI) to acid hydrolysis conventionally used to remove a tetrahydropyranyl protecting group, e.g., dilute hydrochloric acid at room temperature, the corresponding free alcohol (XXI′) is obtained which can be subjected to oxidation using, for example, chromium trioxide in pyridine at room temperature to give the corresponding carbonyl (XXI″). The tricarbocyclic (XXI″) can be converted into valuable estrogens using known procedures, see U.S. Pat. No. 3,150,152.

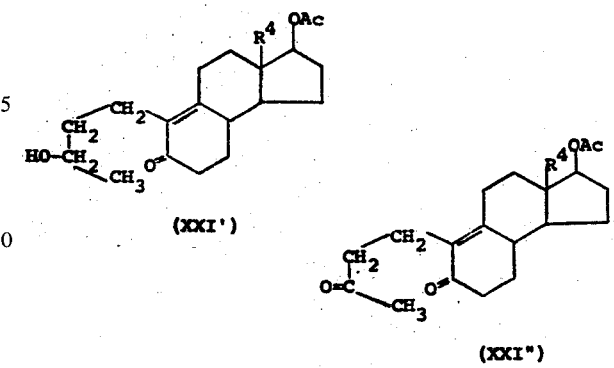

In the above formulas, $R^4$ and Ac are as defined hereinabove.

EXAMPLE 18

The process of Example 3 for the preparation of the bicyclic enol lactone (VII) is repeated with the exception that trifluoroacetyl chloride, acetyl chloride, and trimethylacetyl chloride is used in place of benzoyl chloride and there is obtained the corresponding carboxylic esters of VII, that is, the trifluoroacetate, acetate and trimethylacetate.

What is claimed is:

1. A phosphonate selected from the group having the formulas

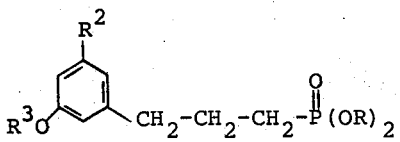

and

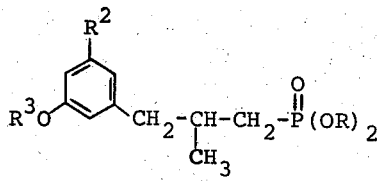

wherein $R^2$ is hydrogen or lower alkoxy; $R^3$ is lower alkyl; and R is lower alkyl or a phenyl.

2. A phosphonate according to claim 1 wherein R is a lower alkyl radical.

3. The phosphonate of claim 2 wherein R is ethyl.

4. A phosphonate according to claim 1 wherein R is a phenyl radical.

* * * * *